United States Patent Office 3,011,220
Patented Dec. 5, 1961

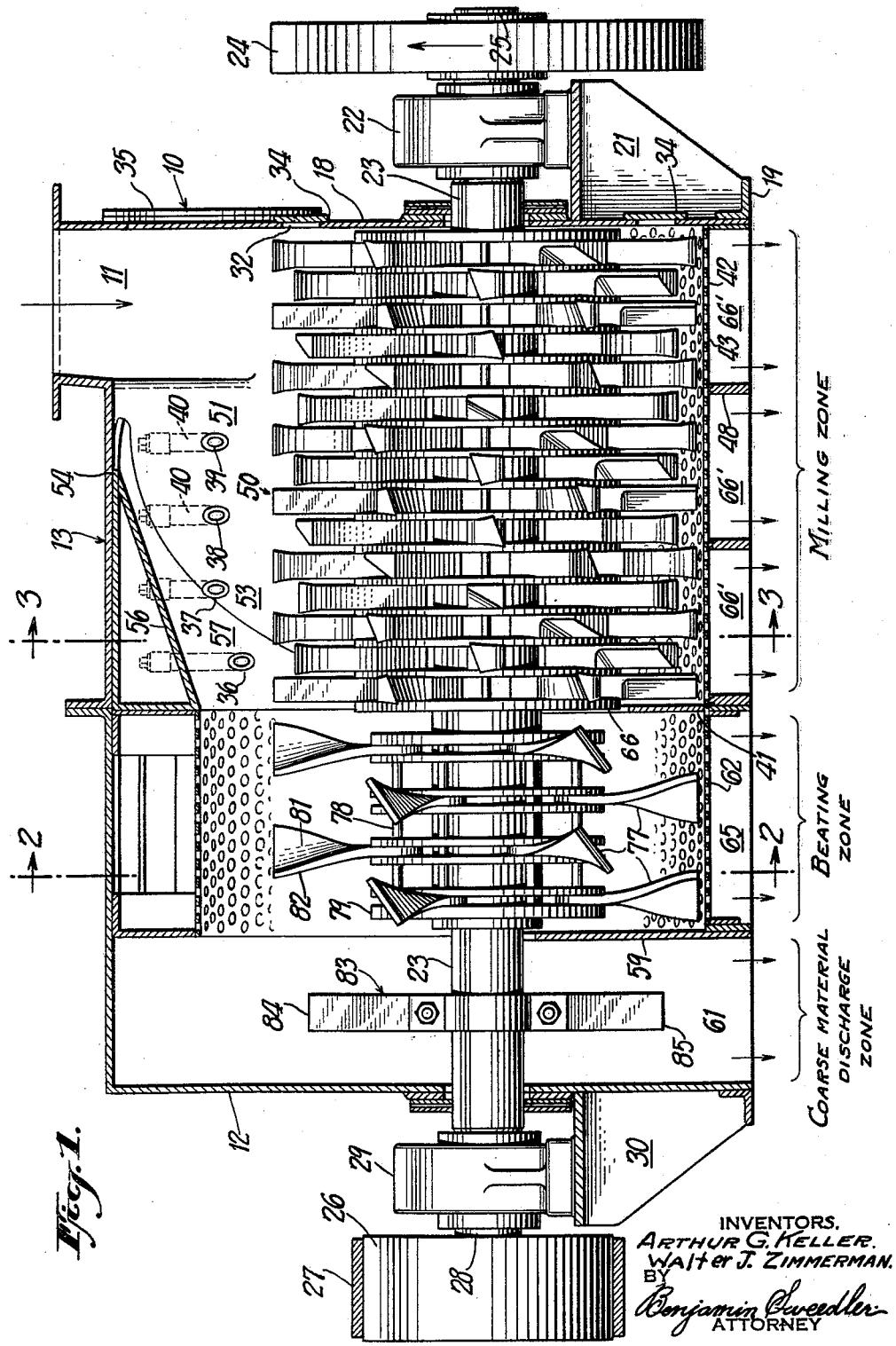

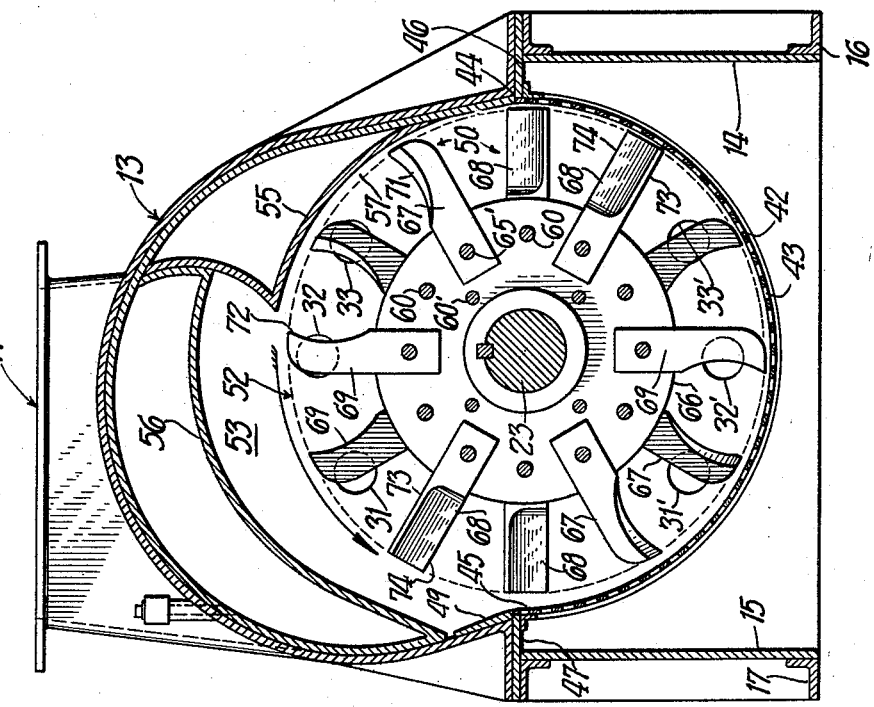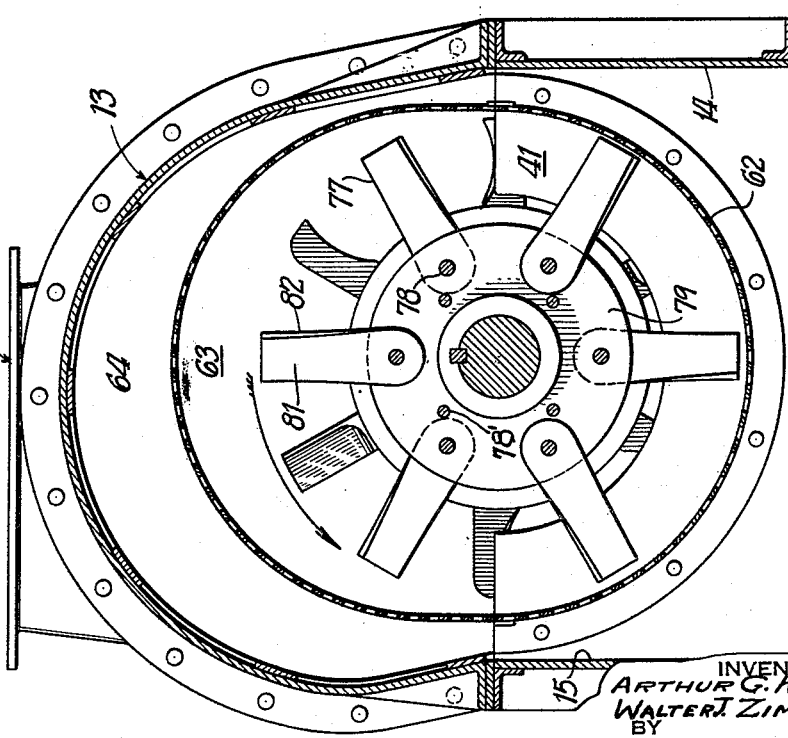

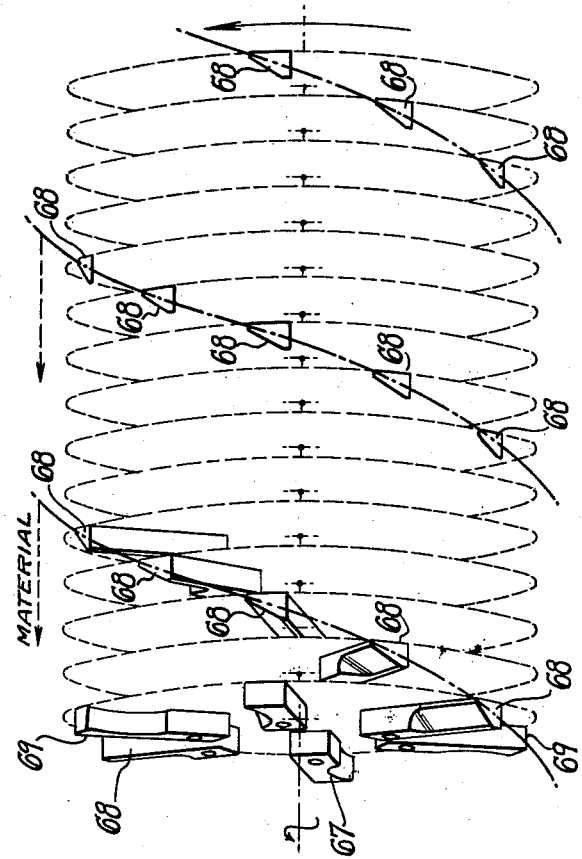
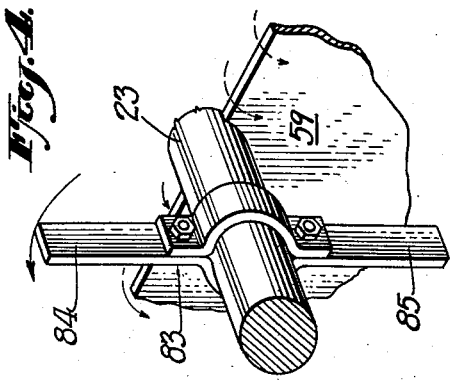

3,011,220
APPARATUS FOR SEPARATING MIXTURES OF COARSE AND FINE MATERIALS
Arthur G. Keller, Baton Rouge, La., and Walter J. Zimmerman, New York, N.Y., assignors to Board of Supervisors of Louisiana State University and Agricultural and Mechanical College, Baton Rouge, La.
Filed May 13, 1958, Ser. No. 734,954
12 Claims. (Cl. 19—7)

The present invention relates to process and apparatus for separating a mixture of coarse and fine materials into their components.

The present invention may be used to effect the efficient separation of crushed stalks, such as sugar cane bagasse, sorgho bagasse, bamboo, reed canes, maize stalks, and similar products, into their fibrous and pith constituents, the separation of excelsior or other fibrous material admixed with cement, used, for example, in the production of insulating and soundproofing boards to separate the fine cement from the coarser excelsior or other fibrous material, to separate wet bark admixed with dirt and other fine particles from the fine particles to obtain relatively clean bark, and in general to separate mixtures of coarse and fine particles in which the fine particles tend to tenaciously adhere to the coarse particles, into their components. Thus, the present invention is applicable to the treatment of the off-quality or inferior insulating and soundproofing boards to permit the ready recovery of the fibrous constituents for use as fuel or for other purposes. It is also applicable to the treatment of wet bark to recover a product suitable for use as a fuel.

In use of the invention for the treatment of crushed stalks, such as bagasse, there results two valuable products, namely, the fibrous material which can be used for paper-making, alpha-cellulose production, pulp, etc., and a pith fraction suitable for use in animal feeds, agricultural mulches and absorbents, and as a filter aid, particularly in the clarification of sugar juices.

The separation of crushed stalks containing pith and fibrous constituents into their components by feeding a mass of the crushed stalks through a longitudinally extending path, subjecting the mass while thus fed to mechanical beating to loosen it and place the pith in a readily separable form, screening the loosened material to screen out the pith while the loosened material is moving through this longitudinally extending path and removing from the terminal end of this path the fibrous material, is disclosed in the Paul M. Horton and Arthur G. Keller U.S. Patents 2,729,856, 2,729,858 and 2,812,552. The present invention involves certain improvements in the processes and apparatus of these U.S. patents. The nature and advantages of these improvements will be clear from the following detailed description of the present invention, a preferred embodiment of which is shown in the accompanying drawings. It will be understood that the invention is not limited to the embodiment shown in the accompanying drawings, but the scope of the invention will be indicated in the claims.

In the drawings,

FIGURE 1 is a vertical lengthwise extending section through the housing of a preferred embodiment of the apparatus of this invention, a portion of this figure being in elevation;

FIGURE 2 is a vertical crosswise extending section through the apparatus of FIGURE 1 taken in a plane passing through line 2—2 on FIGURE 1;

FIGURE 3 is a vertical crosswise extending section taken in a plane passing through line 3—3 on FIGURE 1;

FIGURE 4 is a perspective detail showing a breaker paddle which effects discharge of the coarser material through the discharge chute of the apparatus; and FIGURE 5 is a diagrammatic view showing a preferred arrangement of the hammers in the milling zone.

Referring to FIGURE 1, 10 is a housing having a top inlet 11 at one end thereof and extending in a generally longitudinal direction from this top inlet towards the opposite end wall 12. The upper portion of this housing may be of general cylindrical or elliptical shape and defined by a dome 13 which merges into the vertical side walls 14 and 15 (FIGURES 2 and 3) defining the base portion of the housing. Side walls 14 and 15 may be provided with suitable angle irons 16 and 17, respectively, which brace the side walls and form the supporting surface for the machine. End wall 18 at the inlet end of the machine may be braced with an angle iron 19 at its base. A pedestal 21 is secured to end wall 18 and carries a bearing 22 for a rotor shaft 23 which, in the embodiment of the invention shown in FIGURE 1, extends the full length of the housing 10. Shaft 23 has a flywheel 24 keyed to end 25 and a driving pulley 26 driven by a belt 27 secured to the other end 28 suitably mounted for rotation in bearing 29 fixed to a standard 30 suitably secured to the end wall 12.

End wall 18 of the housing 10 is provided near its top with spaced air inlet ports 31, 32 and 33 and near its base with spaced air inlet ports 31', 32' and 33' (FIGURES 1 and 3). While three top and three base ports are shown on the drawings, it will be understood that any desired number may be employed. The flow of air through each port is controlled by a damper 34, each of which, desirably, is pivotally mounted on end wall 18 and can be adjusted manually to control the extent of the port opening with which it is associated. End wall 18 also has near its top a removable manifold cover 35 which when removed gives access to the inlet 11.

Disposed in one side of the generally cylindrical or elliptical top 13 are the ports 36, 37, 38 and 39 with which communicate the valve controlled conduits 40 for admitting liquid, e.g., water or water solutions, into the housing. In the embodiment of the invention shown in the drawing, four liquid inlets are shown disposed in one side wall, but it will be understood that the number and disposition of the liquid inlets may be varied as desired; such ports may be provided in both sides of the housing, if desired.

The interior of the housing 10 is divided into three distinct zones or sections, each extending in a generally longitudinal direction and the three zones arranged for series flow therethrough. The zone near the inlet end of the housing is the milling zone which extends longitudinally from end wall 18 to a baffle 41, separating the milling zone from the adjacent beating zone. The base of the milling zone is defined by a semi-cylindrical screen 42 having openings 43 therein. Upper ends 44, 45 of screen 42 are suitably fastened to the side plates 46, 47, respectively, extending along the sides of the milling zone. These side plates are secured to the side walls 14 and 15 of the housing 10. Screens 42 rest on supports 48 (FIGURE 1) and may be sectional, e.g., formed of three sections in the modification shown in FIGURE 1, so that each section can readily be replaced if desired by a screen having different sized openings or when worn.

Contiguous to the left upper edge (viewing FIGURE 3) of the screen 42 is the breaker bar 49 suitably secured to the top 13 and side plate 47. This breaker bar extends the full length of the milling zone.

At the inlet end of the milling zone above the hammers 50 (hereinafter more fully described) and contiguous to the inlet 11 is a free space 51 which extends from the top of the hammer circle 52 to the top 13. Hammer circle 52 is the circle defined by the free ends of the rotating hammers 50. The dotted line 52 in FIGURE 3 shows this circle. In FIGURE 3 the arrow above this dotted line 52 indicates the direction of rotation of the hammers 50. Contiguous to free space 51 is a second free space 53 which in the longitudinal direction converges downwardly from point 54 representing the end of free space 51 towards the hammer circle 52. This free space 53 extends in a longitudinal direction from the end of free space 51 to the end of the milling zone, which end is defined by baffle 41. In a crosswise direction (direction at right angles to the length of the milling zone) free space 53 extends from the end of a removable baffle 55 (FIGURE 3) to near the top end of breaker bar 49. The top of free space 53 is defined by a removable baffle 56 shaped to impart the desired configuration to this free space 53 hereinabove described and shown in FIGURES 1 and 3. With baffle 56 so shaped the mixture is forced into contact with the hammers in the locality of the breaker bar 49 insuring efficient loosening of the mixture with partial separation of the fines such that as the mixture passes over the screen 42, the fines thus separated pass through the screen openings 43.

Removable baffle 55 is suitably secured to top 13 adjacent baffle 56 in the right-hand side (viewing FIGURE 3) of the milling zone. This baffle has its arced surface 57 positioned just above the hammer circle 52. This arced surface controls the trajectory of the mixture as it is brought up by the rotating hammers and moved along the surface 57. By replacing baffle 55 with a baffle having a different shaped arced surface 57, desired modification of the trajectory of the mixture as feed into the free space 53 by the rotating hammers 50 may be effected.

The beating zone is defined at one end by the baffle 41 and at the other end by baffle 59 which separates the beating zone from the discharge zone for the coarse material. Baffle 41 serves to retain fine material which has been separated in the milling zone within the zone and causes such fine material to pass through the openings in the screen 42. It also acts to impede somewhat the flow of the coarse material from the milling zone to the beating zone and thus improves the milling and separating action effected in the milling zone.

Baffle 59, which defines one end of the beating zone, may be substantially higher than baffle 41 defining the opposite end. Baffle 59 may extend to a height just short of the rotor shaft 23 as shown in FIGURE 1, or may be made shorter, if desired. Thus, the material is maintained in the beating zone with practically no fine material escaping therefrom and coarse material substantially free of fines are discharged over the baffle 59 into the discharge chute 61. The periphery of the beating zone is defined by a screen 62. In the embodiment shown in FIGURES 1 and 2, this screen is substantially cylindrical, being flattened somewhat at its sides to form the free space 63 (FIGURE 2) above the hammer circle 52. Also, this screen desirably is removably mounted for ready replacement and is provided with openings desirably of smaller cross sectional area than those in screen 42. A semi-circular screen may be used, if desired, in lieu of the cylindrical or substantially cylindrical screen shown; in such construction the upper portion of the beating zone is defined by the portion of the dome 13 defining the top and sides of the beating zone. Dome 13 may be of sectional construction to facilitate its fabrication.

The area 64 between the top of the screen 62 and the dome 13 communicates with the space 65 below the screen. Fine material discharged through this screen flows into the collector space 65 beneath the screen which communicates with a suitable collector for the fine material. The collecting spaces 66' beneath the screen 42 in the milling zone similarly communicate with a collector for the fine material, which may be the same or a different collector, with that which receives the fine material separated out in the beating zone. The arrows is FIGURE 1 to the right of partition 59 indicate the discharge of fine material from the milling and beating zones and the arrows to the left of partition 59, viewing FIGURE 1, indicate the discharge of the coarse material through chute 61, which coarse material is substantially free of fine material.

Mounted on the rotor shaft 23 in the milling zone are several groups of hammers 50. These hammers each have one end pivotally fastened on supporting rods 65' which extend through and between the discs 66, which discs are keyed to the rotor shaft 23. Thus, there is produced an assembly of hammers, each assembly consisting of two discs 66 between which are pivotally mounted the hammers 50 hereinafter described. In the embodiment of FIGURE 1, this assembly consists of fifteen assemblies of hammers, each assembly being mounted between a pair of discs 66 with each disc 66 except the end discs serving as a support for the rods 65' on which two assemblies of hammers are mounted, namely, the assembly of hammers on opposite sides of each disc 66 except the end discs.

As best shown in FIGURE 3, each assembly of hammers consists of three different types of hammers, namely, a lifting hammer 67, a feeding or travel hammer 68, and a milling hammer 69. These different hammers are arranged in radially spaced relation within each assembly or group. In FIGURE 3 in each group radially the hammers are arranged in series of three, each series comprising a lifting hammer 67, a feeding or travel hammer 68, and a milling hammer 69. The front group or assembly of hammers shown in FIGURE 3 (the hammers shown in front of the disc 66) in a radial direction counterclockwise starting with the top milling hammer 69, are a travel hammer 68, a lifting hammer 67, a milling hammer 69, a travel hammer 68, and a lifting hammer 67. It will be noted from this figure that the adjacent assembly of hammers, i.e., those in the back of the disc 66 shown in this figure, have the hammers of the same type as the hammers in the front assembly, spaced radially relative to those in the front assembly. This spacing of like hammers of adjacent assembly. This spacing of like hammers of adjacent rows occurs between each pair of adjacent rows. Thus, as shown in FIGURE 5, each separate type of hammer, i.e., lifting, milling or travel hammer, as the case may be, in all assemblies are arranged in a generally spiral path.

Each lifting hammer 67, as best shown in FIGURE 3, has its free end scoop shaped or formed with a scoop or concave edge portion 71 which when the hammer is rotated tends to scoop up and lift the mixture from the screen and convey it into the upper portion of the milling zone. Each milling hammer 69 has its leading end in the direction of rotation of convex shape and is also provided with a pointed end 72. In the rotation of the hammers, effective beating and milling of the material takes place. The feeding hammers 68 have their free ends tapered from a maximum thickness at 73 to a thin edge 74 at the leading end of the hammer in the direction of rotation. The inclination of the face of the hammer when the hammer is rotated causes the material with which the hammer comes in contact to be pushed and thus fed through the milling zone. Swinging movement of the hammers 50 on rods 65' is limited by rods 60 passing through discs 66. Rods 60 as well as rods 60' reinforce and strengthen the assembly of discs 66 and swinging hammers mounted on rods 65'.

It will be appreciated that the hammers cooperate with each other; the lifting hammers 67 and the feeding hammers 68 have some milling functions but are not as efficient in effecting milling as are the milling hammers 69. Similarly, the milling and travel hammers, of necessity, effect some lifting of the mixture but to a markedly less extent than do the lifting hammers 67, which are particularly designed to scoop and elevate the mixture in the milling zone from the base of the zone into the upper part of the zone. The milling hammers, in addition to effecting efficient milling of the mixture to materially aid in separating the fines from the coarse material, do aid in the lifting of the mixture from the base of the milling zone into the upper part thereof and in the feeding of the mixture through the milling zone.

The hammers 67, 68 and 69 are of rugged design. They may be made from steel bar stock, cast steel or cast ductile iron.

In operation of the machine, the general direction of flow of the mixture through the milling zone is longitudinal in the free space above the hammer circle with a helical component caused by the action of the hammers hereinabove described in continuously removing from the mass of flowing mixture portions thereof and forcing these portions to pass down over the screen and thereafter returning the residual material (a portion of the fine particles will pass through the screen) into the upper part of the milling zone.

In the beating zone, the beaters 77 are pivotally mounted on rods 78 passing through and fixed to discs 79 keyed to rotor shaft 23. These beaters desirably are all alike and are made from steel bar stock, cast steel or cast ductile iron by twisting a flat relatively thin plate to move the free end thereof at an acute angle about 30° to 45° to the plane from which it was twisted. Each beater has one end pivoted to a rod 78 between a pair of discs 79 and the free end twisted as hereinabove described to provide a deflecting surface 81 having a dull narrow edge 82. Rods 78' reinforce and strengthen the assembly of discs 79 and rods 78 on which the beaters 77 are pivotally mounted. These rods 78' also act to limit the swinging movement of the beaters 77.

In FIGURE 1 four groups of beaters are shown, each group containing six beaters (FIGURE 2). It will be understood the number of beaters 77 in each group and the number of groups may be varied.

In the operation of the beaters they loosen the mixture passing therethrough without breaking down the coarser material. Thus, in the case of bagasse or other fibrous material, while the mass of fibrous material is loosened the fiber bundles are not broken in their passage through the beater section.

From the beating zone the fibers are moved by the action of the rotating beaters into chute 61. A breaker paddle 83 is fixed to shaft 23 for rotation therewith. This breaker paddle has diametrically oppositely disposed arms 84, 85. Upon rotation, these arms force the fibrous material to descend through chute 61.

In operation, a mixture of coarse and fine particles is continuously supplied to inlet 11, passes into the free space 51 and also in a downward direction. Dampers 34 are opened to permit air to enter through the ports 31, 32, 33, 31', 32' and 33' into the housing 10. Rotation of the rotor structure, including the hammers and beaters, acts to create a draft through the open ports. The air thus introduced loosens the mixture and prevents clogging and choking of the machine. Under the influence of the fan-like or blower action of the rotating hammers and beaters, a current of air flows continuously through the machine, the volume thereof being regulated by the dampers 34 with the air escaping through the screens 42 and 62 and through the chute 61. This air flow aids in minimizing clogging of the screens.

The action of the hammers in the milling zone is to continuously withdraw from the longitudinally flowing stream of mixture passing through the free space 51 and thence through the free space 53, a portion of the mixture and move the portion thus withdrawn in a generally helical path over the surface of the screen 42, returning it to the free space and back over the screen, etc., while beating and milling the mixture to effectively loosen the fines from the coarse material. As the mixture is repeatedly brought over the surface of the screen 42 the loosened fines gravitate through the openings 43 therein. The residual mixture passes into the beating zone where the mixture is beaten thoroughly to loosen it without, however, causing substantial further subdivision of the coarser material.

In the milling zone liquid desirably is introduced through the inlets 36, 37, 38 and 39. This liquid serves to reduce dust formation and aids in the separation of the fine material from the coarse material by the above-described action of the hammers on the mixture as the latter passes through the milling zone.

By-product liquids from the production of sugar, such as dilute aqueous sugar solutions, may be introduced through the inlets 36, 37, 38, 39 and 40 during the processing of fresh bagasse, i.e., bagasse as it first emerges from a conventional milling operation employed in production of sugar from sugar cane. Such fresh bagasse normally contains between 4% and 6% of soluble solids, the major portion of which are sugars. By treating fresh bagasse in accordance with the present invention, and introducing water or sugar solutions obtained in the sugar recovery operation into the milling zone, an appreciable proportion of the residual sugar in the bagasse can be recovered, thus improving the sugar yield.

It will be noted that the present invention provides apparatus of the hammer mill type for separating coarse and fine mixtures, which apparatus is exceptionally rugged in design and efficient in operation. The apparatus of this invention involves an unusual combination of rugged and durable hammers which exercise a milling, feeding and lifting action on the mixture fed through the milling zone to efficiently process such mixture to effectively loosen the fine material and effect its separation from the coarse material. Substantially complete separation is accomplished due to the combined action taking place in the milling and beating zones, in the latter of which, the mixture containing residual fines is effectively loosened enabling the substantially complete separation of the residual fines through the screen in the beating zone with consequent removal of coarse material substantially free of fines through the coarse material discharge chute.

This separation is effected in a current of air passing through the machine, the volume of which is controlled by the dampers and desirably in the presence of liquid introduced through the liquid inlets, which liquid aids in effecting the desired separation and minimizes dust formation.

Since certain changes may be made in the apparatus and processes hereinabove described for separating coarse and fine materials into their components, it is intended that all matters contained in the above description, or shown in the accompanying drawings, shall be interpreted as illustrative and not in a limiting sense. Thus, for example, while the arrangement of milling, lifting and travel hammers shown in the drawings is preferred, this arrangement may be changed to fit the particular conditions encountered in operation. When, for example, it is necessary to slow down the rate of travel through the machine, some of the travel hammers may be omitted. Also, instead of the top inlet 11, end wall 18 may be provided with a side inlet, say where the manifold cover 35 is positioned, which side inlet communicates with a screw conveyor feed for supplying the mixture of coarse and fine particles to the machine.

What is claimed is:

1. In apparatus for separating a mixture of coarse and fine particles involving a longitudinally elongated housing having an inlet for said mixture at one end thereof, a rotor disposed in said housing extending longitudinally thereof substantially coaxial with the longitudinal axis thereof, a screen in the lower portion of said housing, and hammers on said rotor arranged to rotate through a hammer circle defined by the path of movement of the outer end of said hammers during their rotation, which hammer circle is disposed just above said screen, the improvements which comprise a housing having in sequence starting at the inlet end of said housing a milling zone, a beating zone and a coarse material discharge zone, the milling and beating zones having said screen in the base portions thereof and a plurality of groups of said hammers in side-by-side relation along the length of said rotor, each group of said hammers in said milling zone including a plurality of milling hammers each of which has one end pivoted to the rotor and has a milling surface at the opposite free end, a plurality of lifting hammers each of which has one end pivoted to the rotor and has the opposite free end shaped to scoop the material from the base portion of the milling zone and to elevate the same as the hammers are rotated, and a plurality of feed hammers, each of which has one end pivoted to the rotor and has the face of the opposite free end portion thereof constructed and arranged so that when the hammer is rotated it causes the material to move through said apparatus in a longitudinal direction, and the groups of said hammers in said beating zone each consisting of beaters for beating the material passing therethrough without substantial breaking down of the coarse material passing therethrough.

2. The improved apparatus as defined in claim 1, having at the inlet end of said housing a port for the admission of air into said housing and means for controlling the extent of opening of said port to control the volume of air introduced into said housing.

3. The improved apparatus as defined in claim 1 in which the walls of said housing defining said milling zone have therein a plurality of inlets for introducing liquid into said milling zone, and a partition in the base portion of said housing separating the milling zone from the beating zone contiguous thereto.

4. The improved apparatus in claim 1 having in the end wall disposed contiguous to the inlet end of said housing a plurality of ports for admitting air to said housing, an adjustable damper for each of said ports for controlling the amount of air fed therethrough, and conduits for admitting liquid to said milling zone disposed in spaced relation in the side walls of said housing defining the sides of said milling zone.

5. The improved apparatus as defined in claim 1 having separate screens in the milling and beating zones, respectively, said screens being removably mounted for ready replacement.

6. Apparatus as defined in claim 5 in which the screen in the beating zone has openings of smaller cross sectional area than the openings in the screen in the milling zone.

7. The improved apparatus as defined in claim 1 in which the hammers on said rotor in the milling zone are arranged in groups extending in side by side relationship along the length of said rotor, each group consisting of a plurality of milling hammers each of which has one end pivoted to the rotor and has a convex milling surface at the opposite free end, a plurality of lifting hammers each of which has one end pivoted to the rotor and has the opposite free end shaped to scoop the material from the base portion of the milling zone and to elevate the same as the hammers are rotated, and a plurality of feeding hammers, each of which has one end pivoted to the rotor and the face portion thereof gradually tapered in thickness so that when the hammer is rotated it causes the material to move in a longitudinal direction.

8. Apparatus as defined in claim 7 in which said hammers are arranged in each group in spaced relation to each other and with the hammers of adjacent groups arranged so that the respective milling hammers of adjacent groups are radially spaced from each other, the respective lifting hammers of adjacent groups are radially spaced from each other, and the respective feeding hammers of adjacent groups are radially spaced from each other.

9. Apparatus as defined in claim 8 in which the respective milling, lifting and feeding hammers of adjacent groups of all the groups in the said milling zone are for each type of hammer arranged in a substantially spiral configuration.

10. The improved apparatus as defined in claim 1 in which each beater in said beating zone is in the form of a relatively thin flat plate with one end thereof twisted out of the plane of the flat plate, and the other end pivotally mounted on said rotor.

11. The improved apparatus as defined in claim 1 in which a baffle is disposed in the upper portion of the milling zone above said hammer circle to control the trajectory of the mixture circulated in said milling zone by said hammers, and another baffle is disposed in the base portion of said housing separating the milling zone from the beating zone.

12. The improved apparatus as defined in claim 1 in which the said milling zone is provided with a baffle in the upper part thereof above said hammer circle to control the trajectory of the mixture circulated in said milling zone by said hammers, a baffle is disposed in the base portion of said housing separating the said milling zone from the beating zone, the inlet end of said housing is provided with ports for the admission of air thereinto, means for controlling the extent of opening of said ports to control the volume of air passed through said housing, a plurality of inlets extending through the side walls of said housing into said milling zone for introducing liquid thereinto, and said milling and beating zones each having a screen individual thereto, the cross sectional area of the openings in the screen in the beating zone being smaller than those in the screen in the milling zone.

References Cited in the file of this patent
UNITED STATES PATENTS

| | | |
|---|---|---|
| 400,953 | Sargent | Apr. 9, 1899 |
| 1,459,938 | Thiel | June 26, 1923 |
| 2,729,856 | Horton et al. | Jan. 10, 1956 |
| 2,729,858 | Horton et al. | Jan. 10, 1956 |
| 2,785,865 | Berling | Mar. 19, 1957 |
| 2,812,552 | Horton et al. | Nov. 12, 1957 |
| 2,825,935 | Freeman | Mar. 11, 1958 |